United States Patent [19]

Starr et al.

[11] 4,311,507

[45] Jan. 19, 1982

[54] SPECIAL ENTRANCE SLIT MODULE AND METHOD FOR QUENCHING GLASS SHEETS

[75] Inventors: Eugene W. Starr, Allison Park; George B. Shields, Lower Burrell, both of Pa.

[73] Assignee: PPG Industries, Inc., Pittsburgh, Pa.

[21] Appl. No.: 170,471

[22] Filed: Jul. 21, 1980

[51] Int. Cl.³ .............................................. C03B 27/04
[52] U.S. Cl. ....................................... 65/114; 65/104; 65/351; 65/356
[58] Field of Search ................. 65/104, 106, 107, 114, 65/268, 273, 356, 351

[56] References Cited

U.S. PATENT DOCUMENTS

| | | | |
|---|---|---|---|
| 3,433,614 | 3/1969 | Dickinson et al. | 65/356 X |
| 3,607,198 | 9/21/71 | Meunier | 65/182 A |
| 3,951,634 | 4/1976 | Hall et al. | 65/104 |
| 4,046,543 | 9/6/77 | Shields | 65/25 A |
| 4,204,845 | 5/27/80 | Shields | 65/2 A |

*Primary Examiner*—Arthur D. Kellogg
*Attorney, Agent, or Firm*—Donald C. Lepiane; Edward I. Mates

[57] ABSTRACT

The present invention relates to a special module for the entrance to a cooling station of a glass sheet tempering apparatus and particularly relates to the construction of a pair of upstream modules at the upstream end of the cooling station immediately beyond the exit of a furnace through which glass sheets are transported for heating for subsequent quenching and rapid cooling in order to impart a temper. The special entrance modules of the present invention are cooled by providing a baffle wall spaced upstream of the upstream wall of each upstream module that faces the furnace exit to provide an open ended air chamber between each upstream module and the furnace. In addition, optionally, coolant may be passed through pipe means provided between the furnace and the upstream modules. These changes in upstream module construction result in producing tempered glass with less kink than prior art apparatus having upstream modules not so modified. Preferably, the baffle walls and the optional pipe means are composed of stainless steel.

6 Claims, 4 Drawing Figures

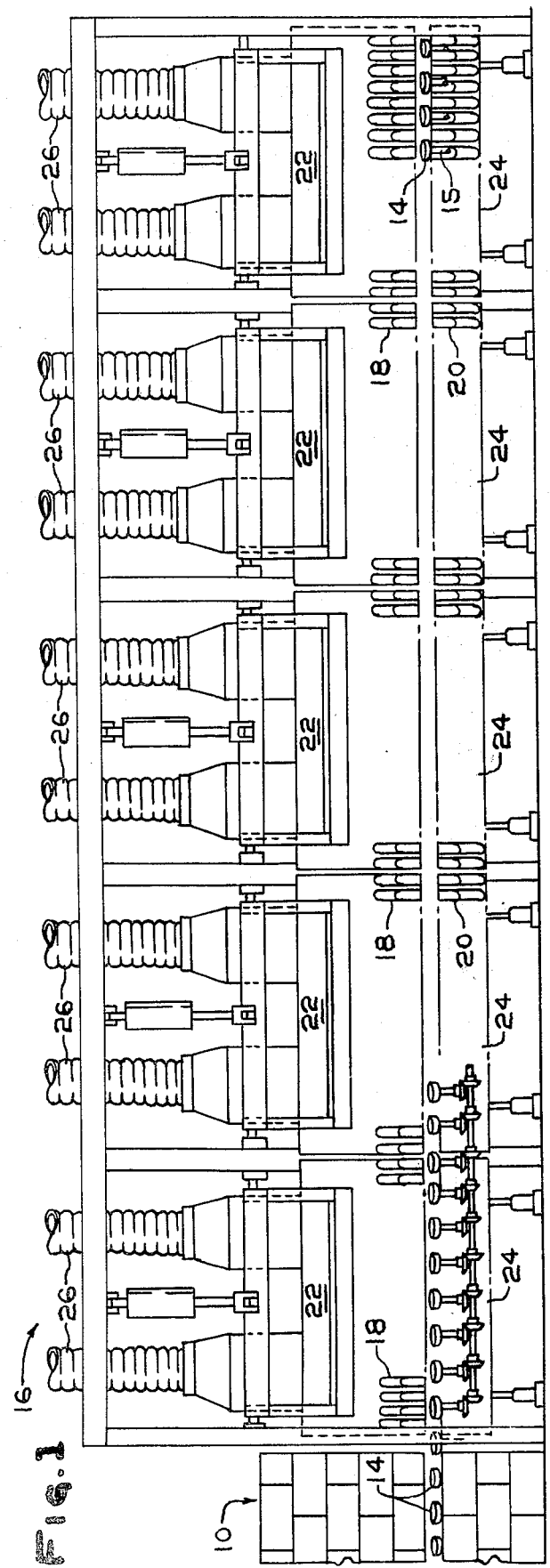
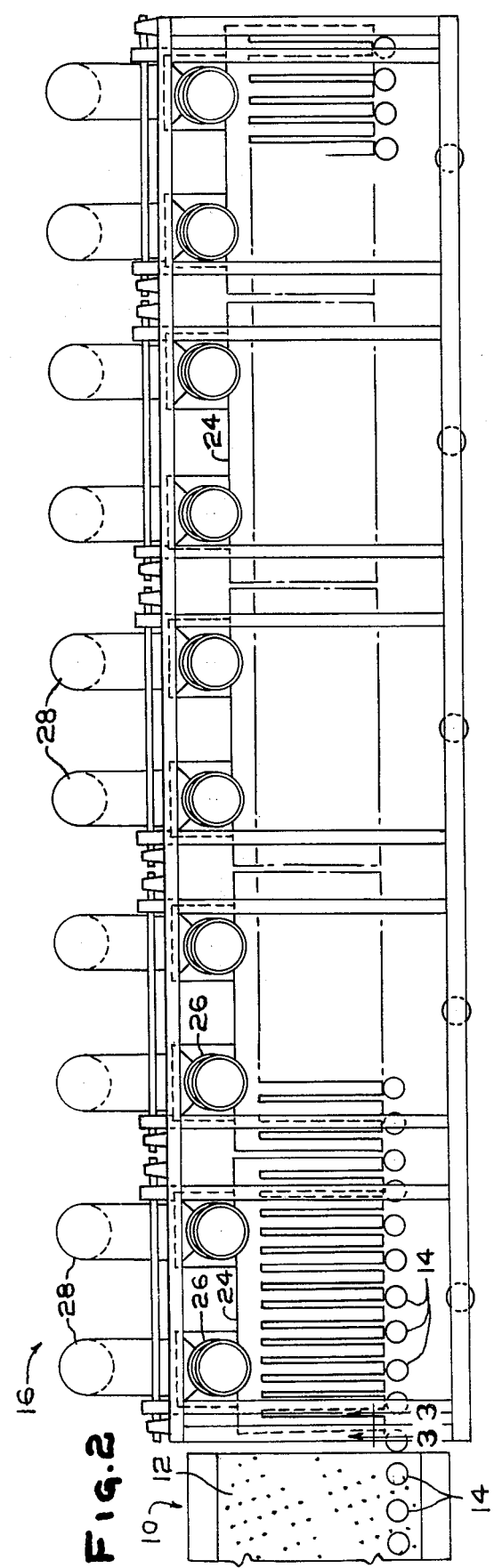

SPECIAL ENTRANCE SLIT MODULE AND METHOD FOR QUENCHING GLASS SHEETS

BACKGROUND OF THE INVENTION

1. Field of the Invention

This invention relates to the tempering of glass sheets and more specifically, to the rapid cooling of hot glass sheets immediately following their heating to a temperature sufficient for tempering while conveying the sheets through a cooling station immediately downstream of a furnace. In the furnace, the conveyed sheets may be supported on a gaseous bed with their major surfaces out of contact with solid members or on spaced, rotating conveyor rolls that make intermittent, momentary contact with the bottom glass sheet surface during said conveyance, or on a combination of rotating rolls and a gaseous support.

The cooling is accomplished using a system for supplying tempering medium in heat exchanging relationship and/or supporting relationship to a sheet or ribbon of glass. Most conveniently, the tempering medium comprises cold air blasted from a source of pressurized air.

The support system is particularly adapted for handling glass in sheet or ribbon form with minimum or no marring or otherwise producing uncontrollable deformation in the major surfaces with respect to the center of the thickness of the glass sheets. Tempering involves heating a glass sheet to an elevated temperature above its annealing range and then rapidly chilling its surfaces to below the strain point while the interior is still hot and continuing the rapid chilling until the entire glass sheet throughout its thickness cools to below its strain point. Such tempering causes the glass sheet to develop a skin of compression stress that surrounds the glass interior which is stressed in tension.

Such a stress distribution makes the tempered glass sheet much stronger than untempered glass so that tempered glass is less likely to fracture then untempered glass when struck by an object. Furthermore, in the less frequent times when an outside force is sufficiently large to cause tempered glass to fracture, tempered glass breaks up into a large number of relatively smoothly surfaced, relatively small particles which are far less dangerous than the relatively large pieces with relatively jagged edges that result from the fracture of untempered glass.

In fabricating glass through known manufacturing techniques of bending, tempering, annealing or coating and combinations of such techniques to form end products having characteristics and uses different from the original product, it is necessary to heat the glass sheets to a temperature above that at which the major surfaces or the contour thereof is changed by deforming stress on contact with solid members. Where it is desired to strengthen the glass, it is further necessary to cool the glass sheets rapidly from such a deformation temperature to a lower temperature below the annealing range of the glass. The effectiveness of such strengthening is improved by an increase in the rate at which heat is removed from the surfaces with respect to the center of the thickness of the glass sheets.

The final temper level in a glass sheet depends on the following variables:

1. Coefficient of thermal expansion of the glass in the viscosity range of $10^{10}$ to $10^{15}$ poises.

2. Relaxation characteristics of the glass in the viscosity range of $10^{10}$ to $10^{15}$ poises.

3. Heat conductivity and specific heat of the glass, including radiation characteristics.

4. Glass thickness.

5. Temperature distribution of the glass at instant cooling starts.

6. Time spent in various cooling stages.

7. Heat flux at the glass-tempering medium interface. Heat flux involves both heat transfer coefficient and the temperatures of the glass and the medium.

For a given glass composition, equal heat extraction at the surface and equal temperatures, thicker glass sheets attain a higher temper than thin glass sheets.

The higher the glass temperature at the onset of cooling (up to a certain value), the higher the final residual stress attained.

The lower the apparent heat conductivity (which includes radiation) the higher is the stress attained.

Temper levels are higher with higher heat extraction rates at the surface.

Higher residual stresses are obtained with glasses having larger coefficients of thermal expansion in the viscosity range of $10^{10}$ to $10^{15}$ poises.

Higher tempers result (up to a certain limit) by increasing the duration of exposure to rapid cooling.

Optical defects become more severe when glass sheets have greater variability in local heat flux rates.

The "faster" the relaxation characteristics, the higher is the temper level attained.

Efficient glass sheet fabrication involving the techniques previously mentioned requires that the glass sheets undergoing treatment be conveyed while hot. The need to convey glass sheets at high temperature has involved undesirable deformation or marring of the major surfaces of glass sheets undergoing treatment due to physical contact of its major surfaces with supporting and conveying apparatus while the glass is at elevated temperatures. Glass sheets have been supported on spaced rotating rolls to reduce deformation due to their engagement with a solid member for more than momentary contact, and on gaseous beds to overcome more fully the defects of deformation and marring due to physical contact of their major surfaces with solid members at elevated temperatures.

Glass sheets have been conveyed through these gaseous beds by supporting the sheets at a small oblique angle to the horizontal and engaging the lower edges thereof with the peripheries of rotating driving discs arranged to form a path of driving along a common tangent. Alternatively, glass sheets have been conveyed through these gaseous beds by engaging the glass edge with fingers supported on carriages that move with the sheets through the entire extent of the gaseous beds to propel the glass sheets through a hot atmosphere within a furnace so as to heat the glass sheets to a temperature sufficient for tempering.

Attempts to cool the glass surfaces rapidly has involved the development of modules for supplying cool gas in a pressure pattern that is non-uniform across the dimension of the glass sheets transverse to their direction of movement through a space between opposite arrays of modules disposed above and below the upper and lower major surfaces of the conveyed glass sheets. Non-uniform rates of cooling have developed non-uniform stress patterns, which are accompanied by optical non-uniformities, sometimes called Q-lines.

One technique for minimizing the appearance of Q-lines has been the application of blasts of air through narrow elongated slots, preferably narrower than one millimeter, extending continuously across the entire width of the conveyed glass sheets. Recognizing that it is difficult to maintain uniform width along the entire length of narrow slots, the prior art used thin mesh screens to separate the walls of the narrow slots and to maintain the uniformity of slot width. The presence of screens impaired the free flow of air through the slots and, hence, limited the heat transfer rate due to the impingement against the glass surface by gas streams flowing through the narrow slots en route to the glass surface.

In one prior art modification, the entire set of prior art modules were made hollow to flow heat exchanging liquid through the hollow passages within the hollowed modules to improve the heat exchange rate by radiation. This solution introduced the problem of handling a liquid supply system for the entire cooling station of glass sheet. Leakage of cooling liquid occurred frequently and was difficult to eliminate. Such a large liquid supply system is needed for the entire cooling station that an alternative, less complicated system would be more desirable.

When glass must be tempered, a large escape area is usually provided for the impinging blasts of cooling medium, such as air, to be released readily from the central portion of the gaseous bed to avoid the establishment of a non-uniform pressure profile across the width of glass sheets transverse to the direction of glass movement. Such pressure profile increases toward the center of the glass and causes the glass to develop one of two metastable conditions, one in which the center of the glass sheets bows upward and another in which the center of the glass sheets bows downward.

When glass is supported on a gaseous support, the thickness of the gas bed is maintained as thin as possible to enable the incoming gas streams to impinge on the glass surface as efficiently as possible rather than blending with the gas bed that is already present. Therefore, when the glass develops a bowed shape due to the metastable conditions described previously, or when the glass develops a kink or departure from flatness, there is insufficient room for the glass to be conveyed between the upper and lower arrays of modules that supply the cool tempering medium needed to cool the glass sufficiently rapidly to develop a stress pattern through the glass thickness that strengthens the glass sufficiently so that the glass develops at least a partial temper.

Glass sheets tend to develop a kink, particularly in their leading edge, during a heat strengthening operation when a series of glass sheets are conveyed first through a hot atmosphere where the sheets in turn are heated to an elevated temperature sufficient for tempering and then through a cool atmosphere where the glass sheets are chilled at a rate sufficient to develop a stress pattern in the glass sheet. Monolithic glass sheets with a kink are difficult to install in architectural spandrels, are difficult to laminate to other glass sheets regardless of whether the other sheets are kinked, and are difficult to fabricate into multiple glazed insulating units comprising two or more glass sheets bonded to each other through spacing frames that extend around their peripheral edges only to form an insulating space between the glass sheets.

Glass sheets tempered with prior art apparatus having thin, elongated slots in modules for the application of cool gas under pressure developed kink, particularly in the first 12 inches (30 cm) of length. Such kinking sometimes interfered with the passage of the flat glass sheets between the upper and lower modules facing the path of glass sheet travel into the cooling area of the tempering apparatus. It was essential for the glass sheet to pass between the closely spaced modules disposed immediately downstream of the exit of the furnace at the entrance to the cooling station of tempering apparatus. It was also important to reduce said kinking sufficiently to enable heat strengthened glass sheets to be installed in architectural frames without developing stress inducing breakage and also to facilitate lamination and fabrication of multiple glazed units free of localized stress due to mismatch of glass sheets so fabricated.

In the past, the insulation of the upstream modules was attempted by inserting a body of heat insulating material, such as fused silica and fiber glass, between the furnace exit and the upstream walls of the upstream modules. However, it required a minimum thickness of 1 inch (25.4 mm) of heat insulating material to reduce module warpage to an acceptable level. Therefore, the upstream module had to be spaced more than 1 inch (25.4 mm) downstream of the furnace exit. Such a length of unsupported span of heat-softened glass required for the heat insulating material resulted in the treated glass sheets having a kink too large to be acceptable. The prior art required a more efficient heat insulation that would permit the placement of the upstream modules sufficiently close to the furnace exit to reduce kink to tolerable limits.

2. Description of Patents of Interest

U.S. Pat. No. 3,607,198 to Meunier et al. discloses a method and apparatus for moving hot glass sheets and similar ribbons that are supported pneumatically out of contact with solid surfaces by establishing alternate zones of static and kinetic gas pressure along the length of sheet movement. The Meunier et al. patent is designed for annealing glass sheets and utilizes slotted module housings with passages to impart blasts of cool air in the cooling portion of the apparatus through narrow slots to support and cool the glass. The modules throughout the length of the cooling station also contain hollow passages for cool liquid to flow therethrough to supplement the air cooling with radiation cooling. Maintaining a supply of cool liquid for each module in the cooling apparatus represents a logistics problem and a leakage problem that the glass cooling art would rather avoid.

The modules disclosed in the Meunier et al. patent are provided with passageways that are fed with water or other coolant material between each of the slots through which air is supplied to both support and cool the glass sheets. The cooling conduits extend throughout the entire length of the cooling area of the Meunier et al. apparatus and may be fed with any fluid such as water, air, or steam, which permits one to control the temperature of the gases flowing upward and of those in static state above the lower modules. Fluid is supplied to the fluid conducting conduits for the sole purpose of controlling the temperature of the air supplied to support and control the manner of glass cooling during an annealing process.

U.S. Pat. No. 4,046,543 to George B. Shields discloses apparatus for cooling and tempering glass sheets that comprises spaced slotted modules that face the opposite surfaces of a glass sheet throughout the length of a cooling station. Cold tempering medium is applied through oblique slots that direct air blasts obliquely away from a furnace exit in a downstream direction of glass sheet movement. The slots are formed in walls of longitudinally spaced, transversely extending modules and may be oriented to apply a transversely downward component of motion to the blasts of tempering medium that impinge against the opposite glass sheet surfaces to force the lower edges of the glass sheets against rotating discs that propel the glass sheets through the cooling station (or at least in the upstream portion of the cooling station).

U.S. Pat. No. 4,204,845 to George B. Shields and Eugene W. Starr discloses apparatus similar to that of the previous patent in which spaced slotted modules are provided in the upstream portion of the cooling station and so called "rosette" modules are provided in the downstream portion of the cooling station to supply a more diffuse pattern than the thin, discrete, laminated streams of tempering medium provided by the slotted modules in the upstream portion.

In both of these latter two patented apparatus, the pair of opposing upstream modules are exposed to the heat of the furnace that is radiated through the furnace exit. Therefore, the upstream modules, both above and below the path of travel taken by the glass sheets through the cooling area are likely to become warped by heat. Prior to the present invention, tempered glass sheets produced on such patented apparatus developed kinks during their production. The kinks were especially noticeable along the leading edge portion of the tempered glass sheets.

SUMMARY OF THE INVENTION

The present invention provides novel structure for the upstream pair of spaced, tempering modules, that is, the first upper module and the first lower module that face one another immediately beyond the furnace exit and provide a narrow space therebetween for the passage of a glass sheet leaving the furnace and entering the cooling station. The novel structure minimizes the kink of the glass sheets produced. The reduction in kink is associated with modifying the module structure of the upstream pairs of modules by incorporating a baffle wall in spaced relation to the upstream wall of each upstream module to provide an open ended chamber between each upstream module and the furnace exit. In a specific embodiment, coolant circulating means may flow in pipe means that spaces the baffle wall from the upstream wall associated therewith. The open air chambers help insulate the upstream modules from the heat of the furnace. Preferably, the baffle wall and optional pipe means are composed of stainless steel. The width of the open ended chamber including the thickness of the baffle wall in the direction of glass sheet movement can be as little as 5/16 inch (7.9 mm). Therefore, the upstream modules can be located as close as possible to the furnace exit, preferably less than 10 mm, downstream of the furnace exit, which reduces the length of the span over which the glass sheets must travel between the support provided in the furnace and that provided by the upstream module. We have found that glass kink is reduced when the length of the unsupported span is reduced.

Other unexpected benefits of this invention are the ability to increase the speed of operations and to improve the compressive stress of tempered glass sheets by approximately four percent at the increased speeds for glass sheets having a nominal thickness of 3 mm.

The present invention will be understood more clearly in the light of a description of a specific embodiment that follows.

BRIEF DESCRIPTION OF THE DRAWINGS

In the drawings that form part of a description of a specific embodiment and wherein like reference numbers are applied to like structural elements, FIG. 1 is a fragmentary longitudinal side elevation of a portion of glass sheet tempering apparatus incorporating an illustrative embodiment of the present invention;

FIG. 2 is a fragmentary, longitudinal sectional view looking in plan at a portion of the apparatus depicted in FIG. 1;

DESCRIPTION OF THE PREFERRED EMBODIMENT

Figure 3:
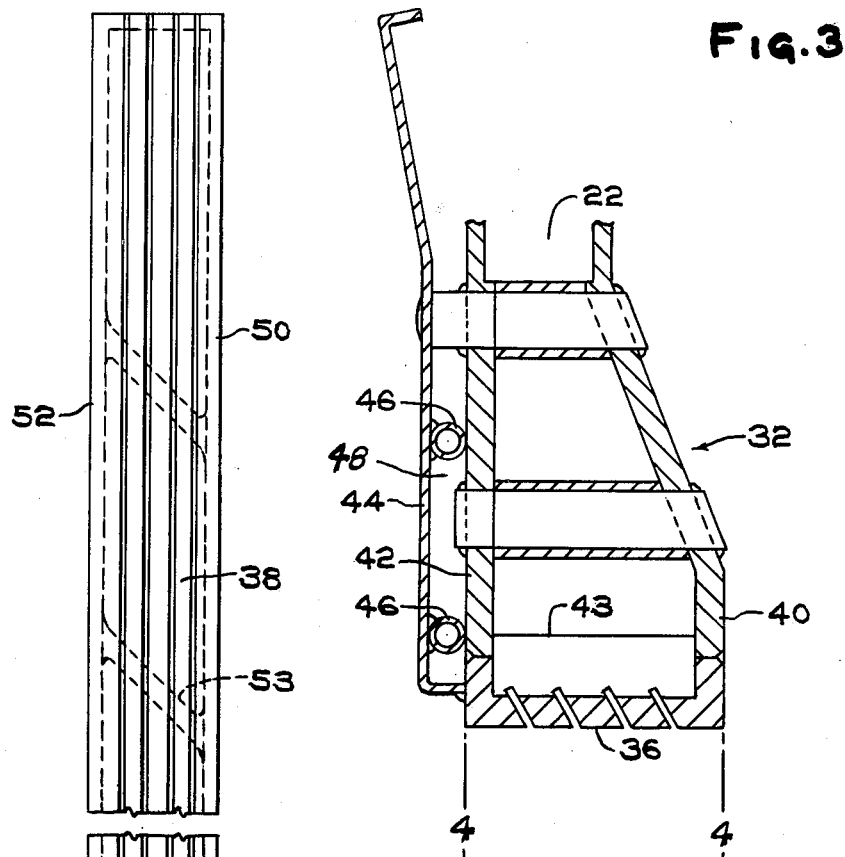
FIG. 3 is an enlarged fragmentary sectional view of a pair of upstream modules located at the upstream portion of the quench beds forming part of a cooling station, said upstream modules being modified in a manner conforming to the present invention.

Referring to the drawings, an illustrative embodiment of apparatus incorporating the present invention comprises a furnace 10 of the gas hearth type depicted in U.S. Pat. Nos. 4,046,543 to Shields and 4,204,845 to Shields and Starr. In such a gas hearth furnace, glass sheets are introduced into a support area at a temperature below that at which the major surfaces will mar on physical contact with solid objects. The glass sheets are heated in turn above the deformation temperature while being supported primarily by gas supplied through apertures in a gas support bed 12 and the glass sheets are cooled after they leave the furnace to a temperature below deformation temperature before they are removed from a gas support. When glass sheets are so treated, the heating is usually supplied by hot gas through the gas support bed supplemented by radiant heat supplied by heaters within the furnace 10. The latter are usually electrical radiant heaters, although gas heaters may also be employed. After the glass sheets are heated to a temperature sufficient for tempering, they are usually cooled sufficiently rapidly to temper and, hence, strengthen the sheets.

According to a typical gas hearth operation, the gas support bed 12 is supported on vertically adjustable jacks (not shown) which support the bed 12 so that its upper surface extends transversely to its length at a slight oblique angle (less than 15°) to the horizontal, usually approximately 5°, and the glass sheets while supported on a gaseous support of the gas support bed 12 in such a tilted relationship to the horizontal have their lower edges driven by friction in contact with a plurality of rotating driving discs 14 of uniform diameter, each mounted on a different drive shaft 15. The latter are aligned along a line parallel to the longitudinal dimension of the gaseous bed 12 so that the driving discs 14 have a common tangential line extending parallel to the direction of movement of the glass sheets.

Beyond the gas hearth type furnace 10 is a cooling station 16. At one side of the cooling station, additional rotating driving discs 14 are located. The latter driving discs are also driven by drive shafts 15 and aligned with the driving discs that propel the glass sheets through the gas hearth type furnace 10. In the cooling station, a plurality of longitudinally spaced, upper, elongated plenum chambers 18 directly oppose a corresponding series of lower, elongated plenum chambers 20. The latter are arranged in alignment with the bed 12 to form a continuation thereof at the same orientation.

The plenum chambers 18 and 20 are in the form of narrow elongated fingers having non-uniform height and extend parallel to one another transversely of the length of the cooling station 16. The higher ends are disposed to the side of the cooling station opposite the side occupied by the rotating driving discs 14, and merge into respective upper and lower common plenum chambers 22 and 24, respectively. Each of the upper common plenum chambers 22 communicates through one of a series of flexible upper supply conduits 26 to blower means (not shown). The lower common plenum chambers 24 are connected through flexible lower supply conduits 28 to blower means (not shown). Suitable pressure controls are provided by way of adjustable valves (not shown) in the supply conduits 26 and 28.

The illustrated apparatus comprises five upper common plenum chambers 22 and five opposite lower common plenum chambers 24. Fewer or more common plenum chambers may be provided as needed. Each common plenum chamber is supplied with pressurized air of controlled magnitude through two flexible supply conduits. There are approximately fifty upper and fifty lower elongated plenum chambers for each common plenum chamber, except that the first upper and lower common plenum chambers are subdivided into two zones, each individually controlled for its pressure and each communicating with about 25 elongated plenum chambers. However, the exact number can be varied according to the design of the system.

Each of the elongated upper plenum chambers 18 and elongated lower plenum chambers 20 is attached to a series of upper modules 32 and a series of lower modules 34, respectively. Each module is closed at its ends and has an open side facing its attached common plenum chamber. Each upper module 32 has a lower apertured wall 36 and each lower module 34 has an upper apertured wall 38 so that cold tempering medium supplied to each module under pressure is directed through narrow slots through the thickness of the apertured walls 36 and 38. The slots of the upstream modules are angled to provide a component of force for cold gas in a downstream direction of movement for glass sheets away from the exit of the furnace 10 when cold air is supplied under pressure to the elongated plenums 18 and 20.

Figure 4:
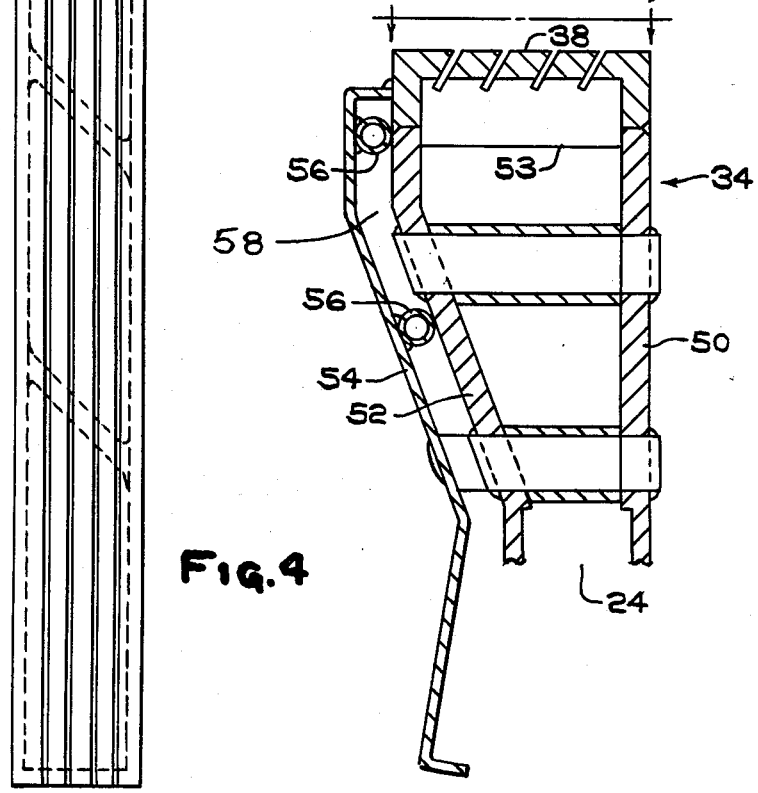
FIG. 4 is a plan view taken along the line 4—4 of FIG. 3 of a fragmentary portion of the upper surface of the lower upstream module before it is modified in the manner shown in FIG. 3.

The downstream modules may be modified as depicted in U.S. Pat. No. 4,046,543 to provide a lesser angle of obliquity as the modules are arranged further downstream of the path of movement through the cooling station 16. As an alternative, the modules may be arranged so that the downstream modules are of the "rosette" type as depicted in U.S. Pat. No. 4,204,845 to Shields and Starr. In any event, the present invention envisions the following modification of the upstream module of both the upper and lower elongated gas bed extending lengthwise of the cooling station 16. The plan view of FIG. 4 shows how the upper wall of the lower module 34 looks before it is modified by the present invention.

The upper module 32, prior to its modification by the present invention, comprises a downstream transverse wall 40 and an upstream transverse wall 42 interconnected to the downstream transverse wall 40 by obliquely extending reinforcing ribs 43. The upstream upper module 32 is modified according to the present invention by attaching to the upstream transverse wall 42 a baffle wall 44 spaced upstream and connected to wall 42 by pipe means 46, which forms an upper, open sided chamber 48 between the upstream transverse wall 42 and the baffle wall 44. Optionally, the pipe means may be used to convey a flow of water across the chamber 48 to further cool the chamber 48 between the exit of the furnace and the upstream upper module 32. Preferably, the baffle wall 44 and the pipe means 46 are composed of stainless steel to facilitate joining and to guarantee against leaks over a long period of use.

Lower module 34 at the upstream end of the lower gas bed is constructed to have a downstream transverse wall 50 interconnected to an upstream transverse wall 52 by oblique reinforcing ribs 53. The modification of the present invention to the upstream module of the lower module bed comprises attaching a lower baffle wall 54 in spaced relation to the upstream transverse wall 52 of the lower upstream module 34, and providing pipe means 56 to form a lower, open sided chamber 58 between the upstream transverse wall 52 and the baffle wall 54. Wall 54 and pipe means 56 are also preferably composed of stainless steel.

Optionally, coolant may be circulated through the pipe means 56 extending across the space between the lower baffle wall 54 and the upstream transverse wall of the lower module 34. However, the flow of air across the lower, open-ended chamber 58 provides sufficient cooling to maintain the lower upstream module 34 at a temperature such that it is insulated somewhat in the same manner as upper upstream module 32 from the heat radiated from the exit end of the furnace. The baffle walls 44 and 54, by virtue of their spacing from the upstream transverse wall 42 and 52, provide open ended insulating chambers 48 and 58 for the upstream modules 32 and 34. Such open ended chambers permit sufficient hot gas flow to avoid moisture condensation on the pipe means when the latter are fed coolant.

Glass sheets of two different thicknesses and two different float glass compositions were fabricated on a tempering apparatus of the type described containing the modified upstream quench modules immediately adjacent the furnace exit. These sheets were compared for kink distortion with similar tempered sheets produced in the same two glass thicknesses prior to the modification of the upstream quench modules of the tempering apparatus according to the present invention.

Kink distortion is defined as the deviation from flatness of a glass sheet and is determined by applying a 12 inch (30 cm) straight edge against the most sharply curved edge portion of the concave major surface of a kinked glass sheet. A thickness gauge inserted between the straight edge and the concave surface of the glass sheet at the most sharply curved portion along the edge of a supposedly flat glass sheet measures its kink or departure from flatness. Measurements were conducted of the same size units.

Table I compares average kink measurements made on production runs of clear and tinted glass sheet compositions of 3 and 5 mm thicknesses during the first month of commercial production following the modification of the upstream modules to compare the apparatus after the upstream modules were modified according to the present invention with prior production records of the same parts taken during the last six months of production before the modification.

TABLE I

KINK MEASUREMENTS BEFORE AND AFTER MODIFYING UPSTREAM MODULES

| Type of Glass | Thickness | Average Kink (in inches) Before Change | Average Kink (in inches) After Change | Percent Improvement |
| --- | --- | --- | --- | --- |
| Clear | 3 mm | .0115 | .0092 | 20% |
| Tinted | 3 mm | .0106 | .0083 | 22% |
| Clear | 5 mm | .0096 | .0070 | 27% |
| Tinted | 5 mm | .0117 | .0058 | 50% |

Articles identified as clear glass were composed of tempered sheets of clear float glass of commercial soda-lime-silica composition. Articles identified as tinted glass were composed of tempered glass sheets having a chemical composition covered in U.S. Pat. No. 3,296,004 to James E. Duncan. Glass sheets of these compositions are sold under the trademark SOLARBRONZE ® by PPG Industries, Inc. It is obvious from the test results that modifying the upstream modules according to the teachings of the present invention reduced the average kink considerably.

During a run of three millimeter thick clear float glass with sheets 76 inches (193 cm) long by 34 inches (87 cm) wide, in determinations of kink at two-hour intervals, no measurable kink was observed for apparatus modified according to this invention, using thickness gauges having a minimum thickness of 0.010 inch (0.25 millimeter).

Production of 3 mm thick float glass sheets to fabricate various sizes of storm doors was accomplished at a line speed of 360 inches (914 cm) per minute to produce transferred glass sheets having an average of 19,200 psi surface compression stress (133 Megapascals) during the last six months of production prior to the modification of the upstream modules according to the present invention. After the modification, the tempering apparatus tempered 3 mm thick float glass sheets at a line speed of 440 inches (1118 cm) per minute to produce tempered glass sheets having an average of 20,000 psi surface compression stress (138 Megapascals).

Stainless steel pipes are preferred as the pipe means 46 and 56, most preferably for the upper pipe means 46, because they have better resistance to heat than other pipe compositions commercially available, such as copper and plastic. Hence, stainless steel pipes have greater longevity in use without developing cracks that cause leaks of coolant onto the glass sheets passing thereunder. Likewise, with the pipe means 46 and 56 composed of stainless steel, stainless steel is also preferred for the baffle walls 44 and 54. Stainless steel baffle walls maintain their shape over a long period of time during their exposure to hot atmospheres and are easy to join to stainless steel pipe means.

The apparatus described in this disclosure represents an illustrative preferred embodiment of the present invention. It is understood that various changes may be made without departing from the gist of the invention as defined in the claimed subject matter which follows.

We claim:

1. A glass sheet temperating apparatus of the type having a furnace for heating a glass sheet, the furnace having an exit end; upper elongated quenching means, including a transverse wall; lower elongated quenching means, including a transverse wall; means for mounting said upper and lower quenching means with their transverse wall spaced from the exit end of the furnace with said lower elongated quenching means in spaced relation to and facing said upper quenching means, wherein a tempered glass sheet made by moving a heated glass sheet from the furnace through and between the upper and lower quenching means has a predetermined kink resulting from the spaced distance between the transverse wall of the quenching means and exit end of the furnace, the improvement comprising:

a baffle wall connected in spaced relation to and substantially coextensive with each transverse wall of the upper and lower quenching means to provide an open-ended compartment therebetween; and pipe means mounted in each of said compartments in a manner to permit the flow of a cooling gas across and through each compartment.

2. The apparatus as set forth in claim 1 further comprising:

means for conveying glass sheets through the furnace and between the quenching means along a path of travel; and said pipe means extend transversely of the path.

3. The apparatus as set forth in claim 2 further comprising:

means for flowing coolant through said pipe means across said open-ended chambers in close adjacency to the exit end of the furnace.

4. The apparatus as set forth in claim 1 wherein said pipe means and said baffle walls are composed of stainless steel.

5. The apparatus as set forth in claim 1 wherein the transverse wall of the upper and lower quenching means are located a maximum distance of about 10 millimeters (0.40 inch) from the furnace exit.

6. In a method of tempering a glass sheet in an apparatus of the type having a furnace for heating a glass sheet, the furnace having an exit end; upper elongated quenching means, including a transverse wall; lower elongated quenching means, including a transverse wall; means for mounting the upper and lower quenching means with their transverse wall spaced from the exit end of the furnace with the lower quenching means in spaced relation to and facing the upper quenching means, wherein the method includes the steps of moving a heated glass sheet through the furnace to heat the sheet to a temperature sufficient for subsequent temper; and moving the heated sheet between the upper and lower quenching means to temper the sheet wherein the sheet has a predetermined kink resulting from the spaced distance between the transverse wall of the quenching means and exit end of the furnace, the improvement comprising:

providing a baffle wall in spaced relation to and substantially coextensive with each transverse wall of the upper and lower quenching means to provide an open-ended compartment therebetween;

moving cooling fluid through pipe means mounted in each compartment; and flowing gas across and through each compartment wherein said step of moving cooling fluid and of flowing gas minimizes thermal damage to the transverse wall of the quenching means by the furnace to permit a reduction in the spaced distance between the exit end of the furnace and the transverse wall of the quenching means to reduce kink in the tempered sheets.

* * * * *

UNITED STATES PATENT AND TRADEMARK OFFICE
CERTIFICATE OF CORRECTION

PATENT NO. : 4,311,507

DATED : January 19, 1982

INVENTOR(S) : Eugene W. Starr and George B. Shields

It is certified that error appears in the above-identified patent and that said Letters Patent are hereby corrected as shown below:

Claim 1, line 1, delete "temperating" and insert --tempering--.

Signed and Sealed this

Twenty-fifth Day of May 1982

[SEAL]

Attest:

GERALD J. MOSSINGHOFF

Attesting Officer     Commissioner of Patents and Trademarks